(12) United States Patent
Yu

(10) Patent No.: US 12,366,495 B2
(45) Date of Patent: Jul. 22, 2025

(54) BLUETOOTH TIRE PRESSURE MONITORING SYSTEM AND METHOD FOR OPERATING THE SAME

(71) Applicant: Chih-Wei Yu, Taipei (TW)

(72) Inventor: Chih-Wei Yu, Taipei (TW)

(73) Assignee: SYSGRATION LTD., Taipei (TW)

( * ) Notice: Subject to any disclaimer, the term of this patent is extended or adjusted under 35 U.S.C. 154(b) by 285 days.

(21) Appl. No.: 18/096,535

(22) Filed: Jan. 12, 2023

(65) Prior Publication Data

US 2023/0236081 A1    Jul. 27, 2023

(30) Foreign Application Priority Data

Jan. 25, 2022  (TW) .................................. 111103201

(51) Int. Cl.
  *G01L 19/08*    (2006.01)
  *G01L 17/00*    (2006.01)
  *H04W 4/80*     (2018.01)

(52) U.S. Cl.
  CPC ............ *G01L 19/086* (2013.01); *G01L 17/00* (2013.01); *H04W 4/80* (2018.02)

(58) Field of Classification Search
  CPC ....... G01L 19/086; G01L 17/00; G01L 19/00; G01L 19/08; H04W 4/80; H04W 4/00; H04W 4/06; H04W 4/025; B60C 23/0479; B60C 23/0447; B60C 23/0433; B60C 23/0401; B60C 23/00; B60C 23/02; B60C 23/04; B60C 23/0408; B60C 23/0472; Y02D 30/70; H04B 17/318
  See application file for complete search history.

(56) References Cited

U.S. PATENT DOCUMENTS

2016/0303925 A1*  10/2016  Liu ..................... B60C 23/0462
2018/0293891 A1*  10/2018  Troutman .............. G08G 1/13

* cited by examiner

Primary Examiner — Brian A Zimmerman
Assistant Examiner — Anthony D Afrifa-Kyei

(57) ABSTRACT

A Bluetooth tire pressure monitoring system and a method for operating the Bluetooth tire pressure monitoring system include a Bluetooth receiver cooperated with the existed Bluetooth tire pressure monitoring system and located at different position from the Bluetooth host. The Bluetooth receiver is connected to the Bluetooth host and the Bluetooth tire pressure sensor. The Bluetooth tire pressure sensor sends the tire pressure info to the Bluetooth host and the Bluetooth receiver respectively. The Bluetooth receiver forwards the tire pressure info to the Bluetooth host to check the tire pressure info again so as to ensure that the tire pressure info that the Bluetooth host received is a complete tire pressure info regardless the distance between the Bluetooth host and the Bluetooth tire pressure sensor.

5 Claims, 6 Drawing Sheets

BLUETOOTH TIRE PRESSURE MONITORING SYSTEM AND METHOD FOR OPERATING THE SAME

BACKGROUND OF THE INVENTION

1. Fields of the Invention

The present invention relates to a Bluetooth tire pressure monitoring system and a method for operating the Bluetooth tire pressure monitoring system.

2. Descriptions of Related Art

In order to allow the drivers to obtain the status of car tires in real time to avoid sudden tire blowout or insufficient tire pressure, and to affect driving safety, many motor vehicles are equipped with tire pressure monitoring systems. The tire pressure monitoring system includes a tire pressure sensor installed to the wheel rim of the car, and a host computer installed inside the car. Each tire pressure sensor read the air pressure in the corresponding tire or other predictive parameters within a certain period of time, such as tire temperature, tire humidity, etc., and then send the read results to the host computer. If the result detected by any tire pressure sensor is abnormal, the tire pressure monitoring system will generate an alarm signal to inform the driver, so that the driver is warned so as to avoid accidents.

The connection for the tire pressure sensor and the host computer are cable-type connection or antenna-type wireless connection. However, these two conventional connection ways will increase the cost and the weight of the cars. Therefore, another tire pressure monitoring system that uses Bluetooth connection has been developed. This method has relative advantages in terms of operation and ease of assembly. The performance has also been greatly improved, and there is no need to go back to the factory to program the tire pressure senor of each tire like the previous technology. In addition, the Bluetooth tire pressure monitoring system is light in weight and easily to be operated.

However, due to the limitation of the short distance of the Bluetooth transmission and the occasional loss of information in Bluetooth transmission, the shortcomings of its accuracy and efficiency of the existed Bluetooth tire pressure monitoring system are concerned. Especially in large multi-wheeled motor vehicles or motor vehicles with a long distance between the tires and the Bluetooth host. Therefore, Bluetooth-connected tire pressure monitoring systems are rarely used in large motor vehicles.

The present invention intends to provide a Bluetooth tire pressure monitoring system and a method for operating the Bluetooth tire pressure monitoring system to eliminate the shortcomings mentioned above.

SUMMARY OF THE INVENTION

The present invention relates to a Bluetooth tire pressure monitoring system and comprises a Bluetooth tire pressure sensor, a Bluetooth host and a Bluetooth receiver. The Bluetooth tire pressure sensor includes an emitting module and a sensing module. The sensing module sends tire pressure info to the emitting module. The Bluetooth tire pressure sensor is Bluetooth paired to at least one of the Bluetooth host and the Bluetooth receiver. The emitting module sends the tire pressure info to at least one of the Bluetooth host and the Bluetooth receiver.

The Bluetooth host includes a receiving/emitting module and a control module. The receiving/emitting module receives the tire pressure info from the Bluetooth tire pressure sensor.

The Bluetooth receiver is Bluetooth paired to the Bluetooth host. The Bluetooth receiver includes an operation module which receives the tire pressure info from the Bluetooth tire pressure sensor. The operation module sends the tire pressure info to the receiving/emitting module.

The present invention also provides a first method for operating a Bluetooth tire pressure monitoring system, and comprises the following steps which are a first transmission step, a second transmission step, an analyzing and back-up step, an adjustment step, a forwarding step, and a confirming step.

The first transmission step is to set the Bluetooth receiver to be a Peripheral mode. The Bluetooth receiver is Bluetooth paired to the Bluetooth host. The Bluetooth receiver is Bluetooth paired to a Bluetooth tire pressure sensor.

The second transmission step is to set the Bluetooth receiver to be a Host mode after the first transmission step is completed. The Bluetooth host and the Bluetooth receiver synchronously receive the tire pressure info from the Bluetooth tire pressure sensor.

The analyzing and back-up step is that the Bluetooth receiver stores the tire pressure info from the Bluetooth tire pressure sensor, and creates a back-up tire pressure info after the second transmission step is completed. The Bluetooth host analyzes whether the Bluetooth tire pressure sensor sends the tire pressure info completely or not. If the tire pressure info from the Bluetooth tire pressure sensor is a complete tire pressure info, go to the confirming step. If the tire pressure info from the Bluetooth tire pressure sensor is not a complete tire pressure info, go to the adjustment step.

The adjustment step is that if Bluetooth host judges that the tire pressure info from the Bluetooth tire pressure sensor is not complete in the analyzing and back-up step, the Bluetooth host sends a Bluetooth message to command the Bluetooth receiver to forward the back-up tire pressure info.

The forwarding step is that the Bluetooth receiver forwards the back-up tire pressure info to the Bluetooth host via Bluetooth communication when the adjustment step is completed.

The confirming step is that if the tire pressure info received by the Bluetooth host in the analyzing and back-up step is complete, or the back-up tire pressure info is forwarded to the Bluetooth host in the forwarding step, the Bluetooth host checks the tire pressure info again. If the Bluetooth host confirms the tire pressure info, the Bluetooth tire pressure monitoring system waits for another first transmission step.

In addition, the present invention relates to a second method for operating a Bluetooth tire pressure monitoring system, and comprises the following steps which are a first transmission step, a second transmission step, a third transmission step, an analyzing step, and a confirming step.

The first transmission step is to set the Bluetooth receiver to be a Peripheral mode of BLE standard protocol, and the Bluetooth receiver is Bluetooth paired to the Bluetooth host.

The second transmission step is to set the Bluetooth receiver to be a Host mode after the first transmission step is completed. The Bluetooth host and the Bluetooth receiver synchronously Bluetooth pair to the Bluetooth tire pressure sensor and receive the tire pressure info from the Bluetooth tire pressure sensor.

The third transmission step is that the Bluetooth receiver sends the tire pressure info from the Bluetooth tire pressure sensor to the Bluetooth host via Bluetooth communication.

The analyzing step is that the Bluetooth host analyzes and confirms the tire pressure info after the third transmission step is completed.

The confirming step is that the Bluetooth host checks the tire pressure info received in the third transmission step. If the Bluetooth host confirms the tire pressure info received in the third transmission step, the Bluetooth tire pressure monitoring system waits for another first transmission step.

The primary object of the present invention is to provide a Bluetooth tire pressure monitoring system and a method for operating the Bluetooth tire pressure monitoring system, and includes a Bluetooth receiver cooperated with the existed Bluetooth tire pressure monitoring system and located at different position from the Bluetooth host. The Bluetooth receiver is connected to the Bluetooth host and the Bluetooth tire pressure sensor. The Bluetooth tire pressure sensor sends the tire pressure info to the Bluetooth host and the Bluetooth receiver respectively. The Bluetooth receiver forwards the tire pressure info to the Bluetooth host to check the tire pressure info again so as to ensure that the tire pressure info that the Bluetooth host received is a complete tire pressure info regardless the distance between the Bluetooth host and the Bluetooth tire pressure sensor.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
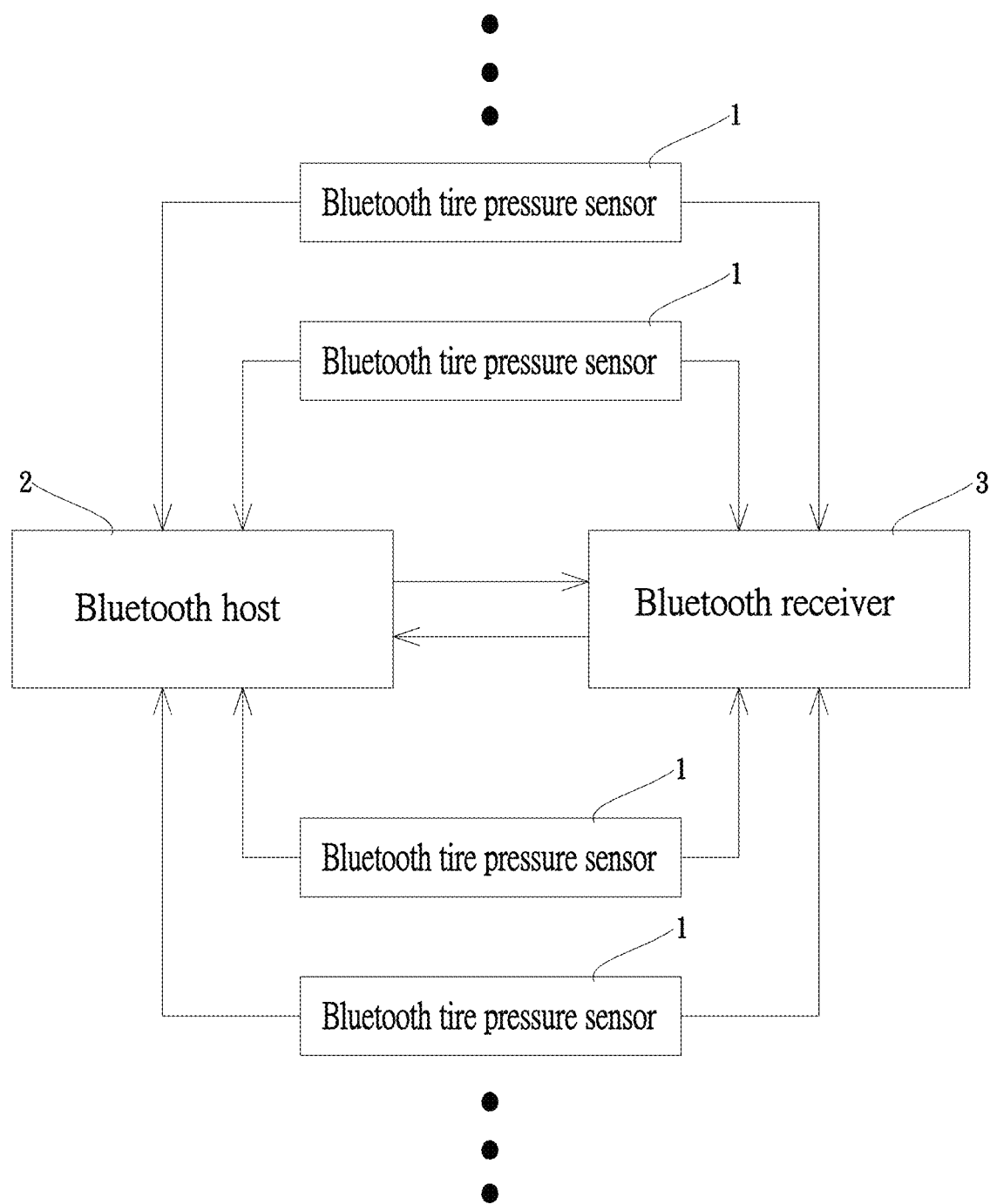
FIG. 1 shows the components of the Bluetooth tire pressure monitoring system of the present invention.

Referring to FIGS. 1 to 5, the Bluetooth tire pressure monitoring system of the present invention comprises a Bluetooth tire pressure sensor 1, a Bluetooth host 2 and a Bluetooth receiver 3. The Bluetooth tire pressure sensor 1 includes an emitting module 11 and a sensing module 12. The sensing module 12 sends the tire pressure info to the emitting module 11. The Bluetooth tire pressure sensor 1 is Bluetooth paired to one of the Bluetooth host 2 and the Bluetooth receiver 3, or both of the Bluetooth host 2 and the Bluetooth receiver 3. The emitting module 11 sends the tire pressure info to one of the Bluetooth host 2 and the Bluetooth receiver 3, or to both of the Bluetooth host 2 and the Bluetooth receiver 3.

As shown in FIGS. 1 to 5, the Bluetooth host 2 includes a receiving/emitting module 21 and a control module 22. The receiving/emitting module 21 receives the tire pressure info from the Bluetooth tire pressure sensor 1.

The Bluetooth receiver 3 is Bluetooth paired to the Bluetooth host 2. The Bluetooth receiver 3 includes an operation module 31 which receives the tire pressure info from the Bluetooth tire pressure sensor 1. The operation module 31 includes a function of sending the tire pressure info to the receiving/emitting module 21.

When in use, the Bluetooth tire pressure sensors 1 are respectively installed to wheel rims of a vehicle and Bluetooth paired to the Bluetooth host 2.

The Bluetooth host 2 can be set to be a Host, or both a Host and a Peripheral, wherein the Host meets the requirements of Bluetooth Low Energy (BLE) standard protocol.

Furthermore, the Bluetooth receiver 3 has the functions of operating the Host and the Peripheral that meet the BLE standard protocol.

The Bluetooth tire pressure sensors 1 has the functions of operating the Peripheral, or both of the Host and the Peripheral that meet the BLE standard protocol. The Bluetooth tire pressure sensors 1 is able to send the tire pressure info in a form of advertising pockets.

The control module 22 is able to confirm whether the tire pressure info from the receiving/emitting module 21 is a complete tire pressure info or not, so as to judge whether the tire pressure info exceeds a preset value or not.

The Bluetooth host 2 includes a monitor module. When the control module 22 confirms that the tire pressure info from the receiving/emitting module 21 is a complete tire pressure info, the monitor displays the tire pressure info.

Figure 2:
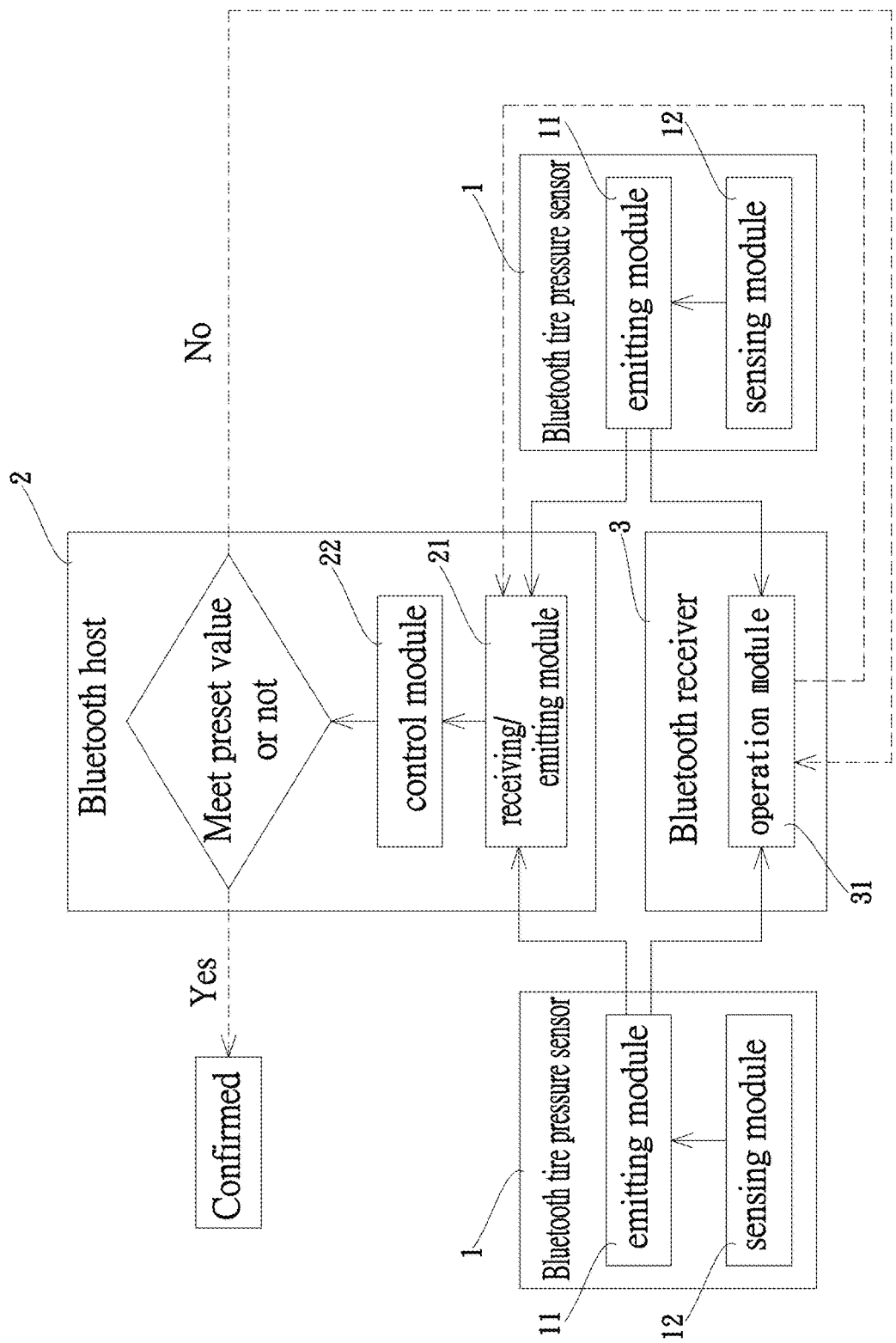
FIG. 2 shows the first method for operating the Bluetooth tire pressure monitoring system of the present invention.
Figure 3:
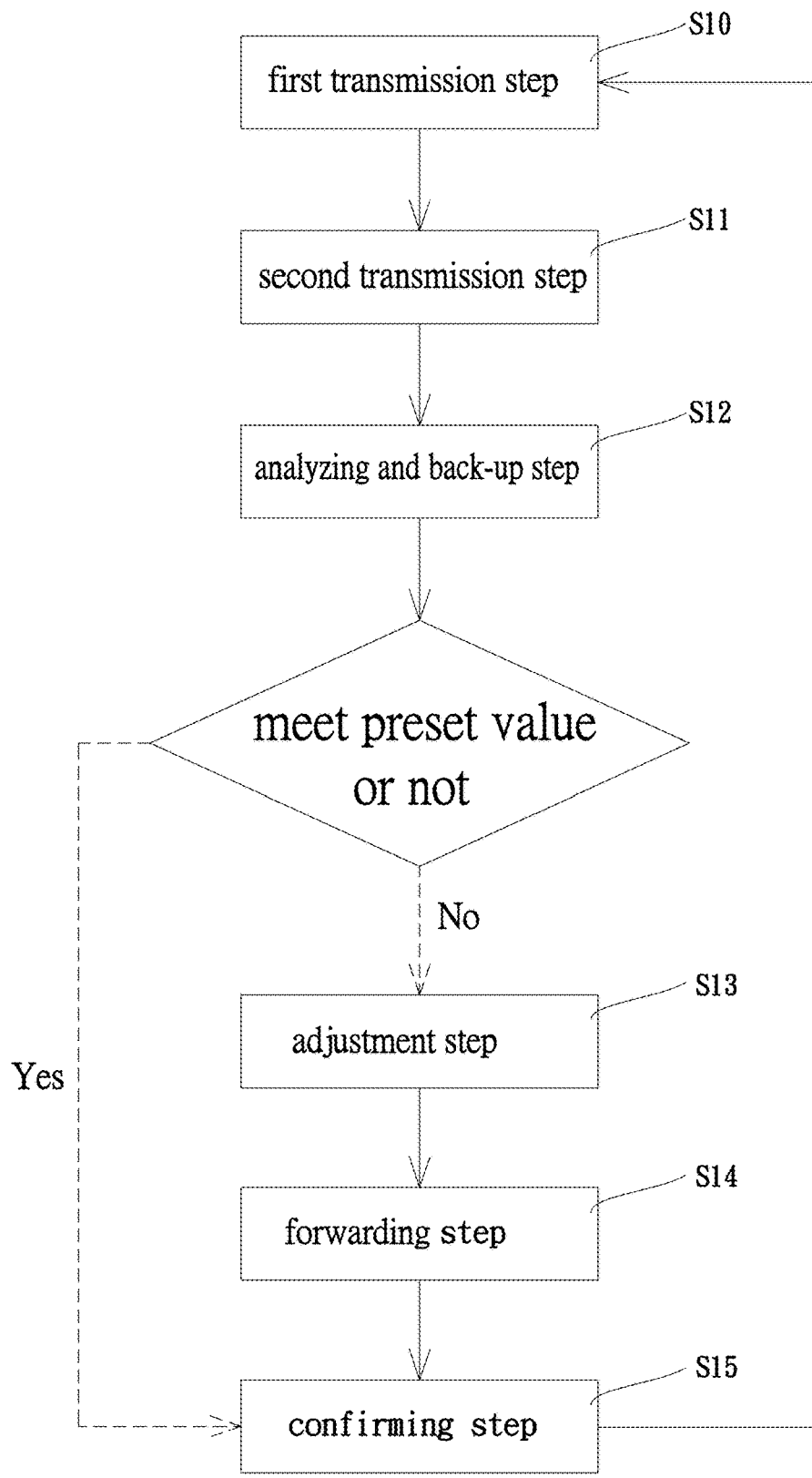
FIG. 3 is the steps of the first method for operating the Bluetooth tire pressure monitoring system of the present invention.

As shown in FIGS. 1-3, the first method for operating the Bluetooth tire pressure monitoring system comprises the following steps which are a first transmission step S10, a second transmission step S11, an analyzing and back-up step S12, an adjustment step S13, a forwarding step S14, and a confirming step 15.

The first transmission step S10 is to set the Bluetooth receiver 3 to be a Peripheral mode of Bluetooth Low Energy (BLE) standard protocol. The Bluetooth receiver 3 is Bluetooth paired to the Bluetooth host 2. The Bluetooth receiver 3 is Bluetooth paired to the Bluetooth tire pressure sensor 1.

The second transmission step S11 is to set the Bluetooth receiver 3 to be a Host mode of Bluetooth Low Energy (BLE) standard protocol after the first transmission step S10 is completed. The Bluetooth host 2 and the Bluetooth receiver 3 synchronously receive the tire pressure info from the Bluetooth tire pressure sensor 1.

The analyzing and back-up step S12 is that the Bluetooth receiver 3 stores the tire pressure info from the Bluetooth tire pressure sensor 1, and creates a back-up tire pressure info after the second transmission step S11 is completed. The Bluetooth host 2 analyzes whether the Bluetooth tire pressure sensor 1 sends the tire pressure info completely. If the tire pressure info from the Bluetooth tire pressure sensor 1 is a complete tire pressure info, go to the confirming step S15. If the tire pressure info from the Bluetooth tire pressure sensor 1 is not a complete tire pressure info, go to the adjustment step S13.

The adjustment step S13 is that if the Bluetooth computer 2 judges that the tire pressure info from the Bluetooth tire pressure sensor 1 is not complete in the analyzing and back-up step S12, the Bluetooth computer 2 sends a Bluetooth message to command the Bluetooth receiver 3 to forward the back-up tire pressure info.

The forwarding step S14 is that the Bluetooth receiver 3 forwards the back-up tire pressure info to the Bluetooth host 2 via Bluetooth communication when the adjustment step S13 is completed.

The confirming step S15 is that if the tire pressure info received by the Bluetooth host 2 in the analyzing and back-up step S12 is complete, or the back-up tire pressure info has been forwarded to the Bluetooth host 2 in the forwarding step S14, the Bluetooth host 2 checks the tire pressure info again. If the Bluetooth host 2 confirms the tire pressure info, the Bluetooth tire pressure monitoring system waits for another first transmission step S10.

Figure 4:
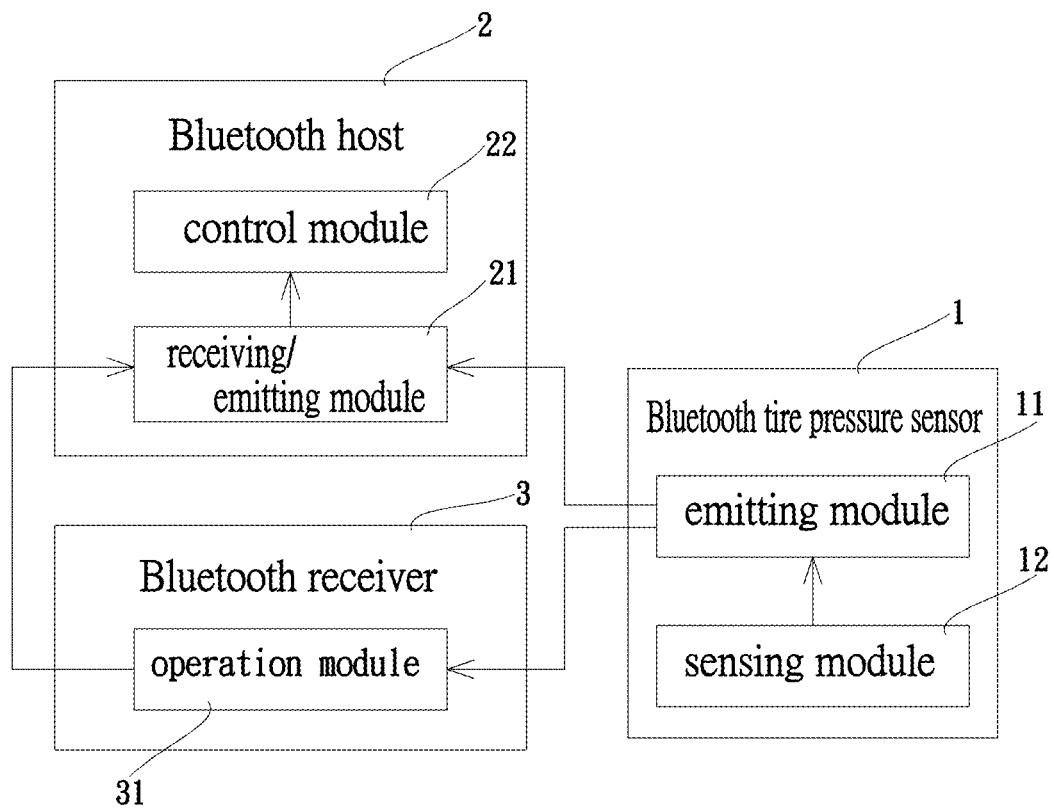
FIG. 4 shows the second method for operating the Bluetooth tire pressure monitoring system of the present invention.
Figure 5:
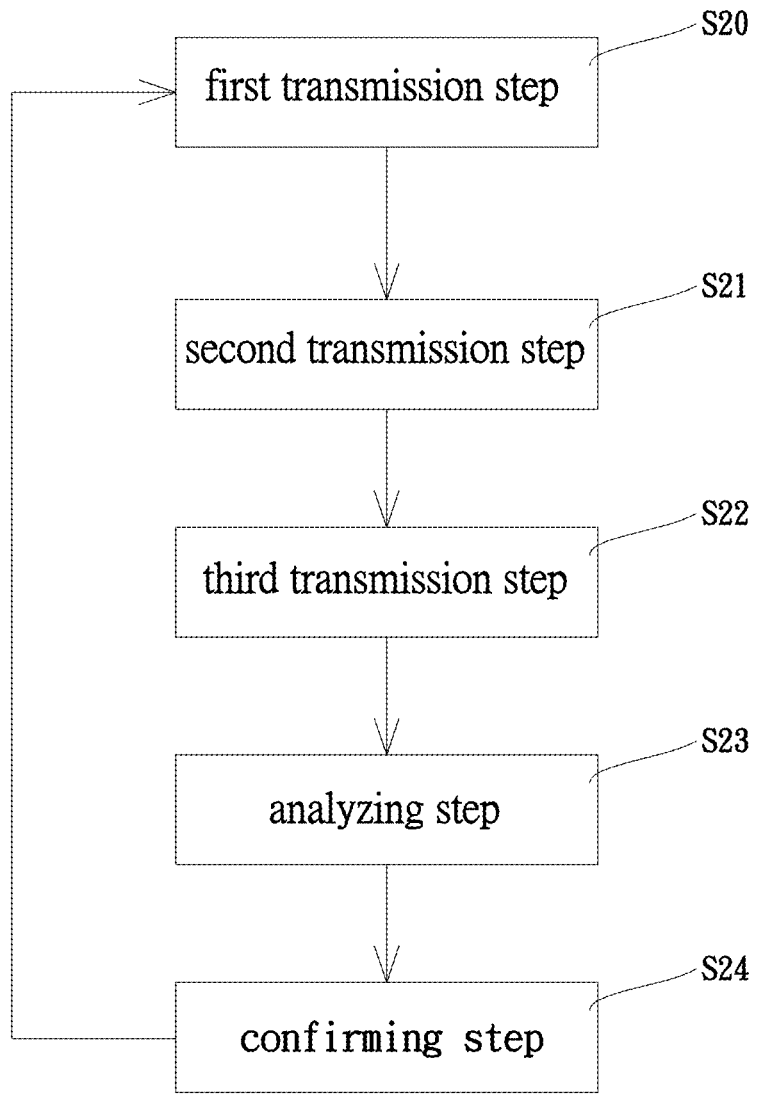
FIG. 5 is the steps of the second method for operating the Bluetooth tire pressure monitoring system of the present invention.
Figure 6:
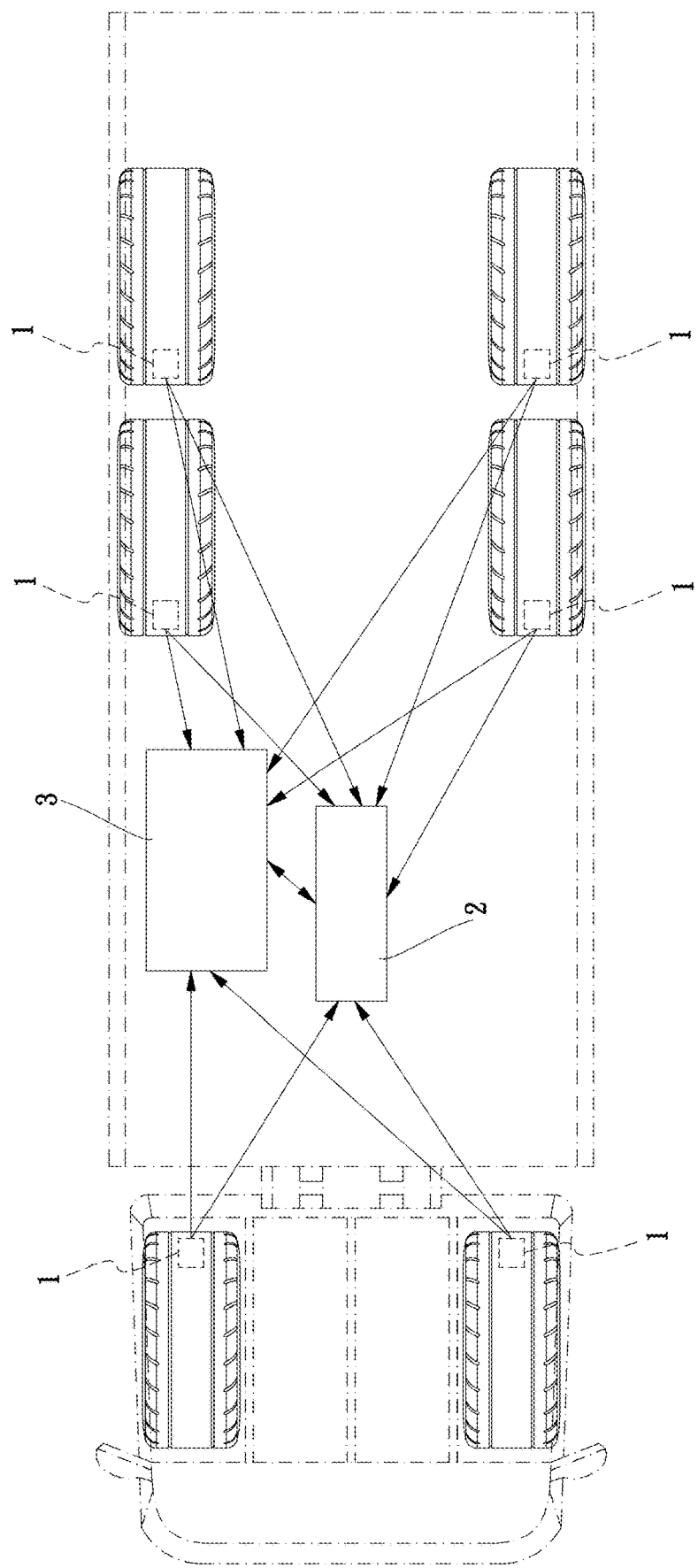
FIG. 6 shows that the components of the Bluetooth tire pressure monitoring system of the present invention equipped to a six-wheel vehicle.

As shown in FIGS. 4 and 5, the arrows in FIG. 4 are the direction that the tire pressure info is delivered, and the dotted lines in FIG. 3 show that the directions of operation of the Bluetooth tire pressure monitoring system proceed after the control module 22 judges the tire pressure info. The second method for operating the Bluetooth tire pressure monitoring system comprises the following steps which are a first transmission step S20, a second transmission step S21, a third transmission step S22, an analyzing step S23, and a confirming step S24.

The first transmission step S20 is to set the Bluetooth receiver 3 to be a Peripheral mode of Bluetooth Low Energy (BLE) standard protocol, and the Bluetooth receiver 3 is Bluetooth paired to the Bluetooth host 2.

The second transmission step S21 is to set the Bluetooth receiver 3 to be a Host mode of Bluetooth Low Energy (BLE) standard protocol after the first transmission step S20 is completed. The Bluetooth host 2 and the Bluetooth receiver 3 synchronously paired to the Bluetooth tire pressure sensor 1, and receive the tire pressure info from the Bluetooth tire pressure sensor 1.

The third transmission step S22 is that the Bluetooth receiver 3 sends the tire pressure info from the Bluetooth tire pressure sensor 1 to the Bluetooth host 2 via Bluetooth communication;

The analyzing step S23 is that the Bluetooth host 2 analyzes the tire pressure info and confirms the tire pressure info is not abnormal after the third transmission step S22 is completed.

The confirming step S24 is that the Bluetooth host 2 checks the tire pressure info received in the third transmission step S22 again. If the Bluetooth host 2 confirms the tire pressure info received in the third transmission step S22, the Bluetooth tire pressure monitoring system waits for another first transmission step S20.

The Bluetooth tire pressure monitoring system of the present invention has the functions of allocation. The operation module 31 of the Bluetooth receiver 3 judges the position and orientation of the Bluetooth tire pressure sensor 1 according to at least one of the distance, angle and signal strength from the Bluetooth tire pressure sensor 1. The user operates the Bluetooth tire pressure monitoring system to assist the control module 22 of the Bluetooth host 2 to acknowledge the wheel position of the Bluetooth tire pressure sensor 1 so as to check the needed info. This method also easily to allow the Bluetooth host 2 to position the orientation and series number of the wheel. The present invention improves the shortcoming of the conventional tire pressure monitoring system which requires the users to bring the conventional system back to the manufacturers to obtain the tire pressure sensor of each wheel.

While we have shown and described the embodiment in accordance with the present invention, it should be clear to those skilled in the art that further embodiments may be made without departing from the scope of the present invention.

What is claimed is:

1. A Bluetooth tire pressure monitoring system comprising:
a Bluetooth tire pressure sensor, a Bluetooth host and a Bluetooth receiver, the Bluetooth tire pressure sensor including an emitting module and a sensing module, the sensing module sending a tire pressure information to the emitting module, the Bluetooth tire pressure sensor being Bluetooth paired to at least one of the Bluetooth host and the Bluetooth receiver, the emitting module sending the tire pressure information to at least one of the Bluetooth host and the Bluetooth receiver;
the Bluetooth host including a receiving/emitting module and a control module, the receiving/emitting module receiving the tire pressure information from the Bluetooth tire pressure sensor, and
the Bluetooth receiver being Bluetooth paired to the Bluetooth host, the Bluetooth receiver including an operation module which receives the tire pressure information from the Bluetooth tire pressure sensor, the operation module sending the tire pressure information to the receiving/emitting module, wherein the Bluetooth receiver stores the tire pressure information from the Bluetooth tire pressure sensor, and creates a back-up tire pressure information, the Bluetooth host analyzes whether the Bluetooth tire pressure sensor sends the tire pressure information completely, if the Bluetooth host judges that tire pressure information from the Bluetooth tire pressure sensor is not complete, the Bluetooth host sends a Bluetooth message to command the Bluetooth receiver to forward the back-up tire pressure information.

2. The Bluetooth tire pressure monitoring system as claimed in claim 1, wherein the control module confirms the tire pressure information from the receiving/emitting module and judges whether the tire pressure information exceeds a preset value or not.

3. The Bluetooth tire pressure monitoring system as claimed in claim 1, wherein the Bluetooth host includes a monitor module which is connected to a monitor to display the tire pressure information.

4. A method for operating a Bluetooth tire pressure monitoring system, comprising:
a first transmission step: setting a Bluetooth receiver to be a Peripheral mode, the Bluetooth receiver being Bluetooth paired to a Bluetooth host, the Bluetooth receiver being Bluetooth paired to a Bluetooth tire pressure sensor;
a second transmission step: setting the Bluetooth receiver to be a Host mode after the first transmission step is completed, the Bluetooth host and the Bluetooth receiver synchronously receiving a tire pressure information from the Bluetooth tire pressure sensor;
an analyzing and back-up step: the Bluetooth receiver storing the tire pressure information from the Bluetooth tire pressure sensor, and creating a back-up tire pressure information after the second transmission step is completed, the Bluetooth host analyzing whether the Bluetooth tire pressure sensor sends the tire pressure information completely, if the tire pressure information from the Bluetooth tire pressure sensor is a complete tire pressure information, go to a confirming step, if the tire pressure information from the Bluetooth tire pressure sensor is not a complete tire pressure information, go to an adjustment step;

the adjustment step: if the Bluetooth host judges that tire pressure information from the Bluetooth tire pressure sensor is not complete in the analyzing and back-up step, the Bluetooth host sending a Bluetooth message to command the Bluetooth receiver to forward the back-up tire pressure information;

a forwarding step: the Bluetooth receiver forwarding the back-up tire pressure information to the Bluetooth host via Bluetooth communication when the adjustment step is completed, and the confirming step: if the tire pressure information received by the Bluetooth host in the analyzing and back-up step is complete, or the back-up tire pressure information being forward to the Bluetooth host in the forwarding step, the Bluetooth host checking the tire pressure information again, if the Bluetooth host confirms the tire pressure information, the Bluetooth tire pressure monitoring system waits for another first transmission step.

5. A method for operating a Bluetooth tire pressure monitoring system, comprising:

a first transmission step: setting the Bluetooth receiver to be a Peripheral mode, the Bluetooth receiver being Bluetooth paired to the Bluetooth host;

a second transmission step: setting the Bluetooth receiver to be a Host mode after the first transmission step is completed, the Bluetooth host and the Bluetooth receiver synchronously Bluetooth pairing to the Bluetooth tire pressure sensor and receiving a tire pressure information from the Bluetooth tire pressure sensor;

a third transmission step: the Bluetooth receiver sending the tire pressure information from the Bluetooth tire pressure sensor to the Bluetooth host via Bluetooth communication;

an analyzing step: the Bluetooth host analyzing and confirming the tire pressure information after the third transmission step is completed, and;

a confirming step: the Bluetooth host checking the tire pressure information received in the third transmission step again, if the Bluetooth host confirms the tire pressure information received in the third transmission step, the Bluetooth tire pressure monitoring system waits for another first transmission step, and an analyzing and back-up step: the Bluetooth receiver storing the tire pressure information from the Bluetooth tire pressure sensor, and creating a back-up tire pressure information, the Bluetooth host analyzing whether the Bluetooth tire pressure sensor sends the tire pressure information completely, if the tire pressure information from the Bluetooth tire pressure sensor is not a complete tire pressure information, the Bluetooth host sends a Bluetooth message to command the Bluetooth receiver to forward the back-up tire pressure information.

* * * * *